United States Patent
Yang

(10) Patent No.: US 8,180,327 B2
(45) Date of Patent: May 15, 2012

(54) METHOD, DEVICE, AND MOBILE TERMINAL FOR CONTROLLING LOCKING AND UNLOCKING

(75) Inventor: Jun Yang, Shenzhen (CN)

(73) Assignee: Huawei Device Co., Ltd, Shenzhen (CN)

( * ) Notice: Subject to any disclaimer, the term of this patent is extended or adjusted under 35 U.S.C. 154(b) by 37 days.

(21) Appl. No.: 12/953,836

(22) Filed: Nov. 24, 2010

(65) Prior Publication Data

US 2011/0159849 A1 Jun. 30, 2011

(30) Foreign Application Priority Data

Dec. 29, 2009 (CN) .......................... 2009 1 0243224

(51) Int. Cl.
*H04M 1/66* (2006.01)

(52) U.S. Cl. ..... 455/411; 455/410; 455/418; 455/556.1; 455/566; 455/344; 345/156; 345/169; 345/173; 345/619; 345/649; 715/863; 715/864

(58) Field of Classification Search .................. 455/410, 455/411, 414.1, 418, 456.1, 550.1, 556.2, 455/566, 344, 26.1; 345/156, 169, 173, 619, 345/649; 715/863, 864
See application file for complete search history.

(56) References Cited

U.S. PATENT DOCUMENTS

| 7,498,951 | B2 * | 3/2009 | Wardimon | 340/691.3 |
| 8,072,435 | B2 * | 12/2011 | Hsieh et al. | 345/173 |
| 2004/0123161 | A1 | 6/2004 | Harada et al. | |
| 2008/0171539 | A1 * | 7/2008 | Ahonen et al. | 455/414.1 |
| 2008/0305771 | A1 | 12/2008 | Yajima et al. | |
| 2009/0146962 | A1 * | 6/2009 | Ahonen et al. | 345/173 |
| 2009/0167717 | A1 * | 7/2009 | Wang et al. | 345/173 |
| 2009/0262078 | A1 * | 10/2009 | Pizzi | 345/169 |
| 2010/0123664 | A1 * | 5/2010 | Shin et al. | 345/169 |
| 2010/0197273 | A1 | 8/2010 | Uchida | |
| 2011/0012926 | A1 * | 1/2011 | Kerr et al. | 345/649 |
| 2011/0081889 | A1 * | 4/2011 | Gao et al. | 455/411 |
| 2011/0159849 | A1 | 6/2011 | Yang | |

FOREIGN PATENT DOCUMENTS

| CN | 101321344 A | 12/2008 |
| CN | 101518111 A | 8/2009 |
| CN | 101827160 A | 9/2010 |
| JP | 2007-13546 A | 1/2007 |
| WO | WO 02/103497 A1 | 12/2002 |
| WO | WO 2011/079622 A1 | 7/2011 |

* cited by examiner

*Primary Examiner* — Olumide T Ajibade Akonai
(74) *Attorney, Agent, or Firm* — Slater & Matsil, L.L.P.

(57) ABSTRACT

A method, a device, and a mobile terminal for controlling locking and unlocking are provided. The method includes the following steps. An acceleration sensor is adopted to detect a location state of a mobile terminal. A stabilization timer is started and a stabilization timing value of the stabilization timer is monitored when the mobile terminal is in an unlocked or a locked state. The stabilization timing value is reset to restart timing when it is monitored that the location state of the mobile terminal is unstable. The mobile terminal is controlled to enter a stable and unlocked state when it is monitored that the stabilization timing value reaches a stabilization timing threshold. Through the technical solutions, it is determined whether the mobile terminal enters the stable and unlocked state according to the location state of the mobile terminal in the locked or unlocked state. In this manner, the mobile terminal may not be locked in the stable state, and the afterward operations may be facilitated, thereby increasing usability of the mobile terminal and improving user's experience.

15 Claims, 4 Drawing Sheets

METHOD, DEVICE, AND MOBILE TERMINAL FOR CONTROLLING LOCKING AND UNLOCKING

This application claims priority to Chinese Patent Application 200910243224.4, filed on Dec. 29, 2009, which application is incorporated herein by reference.

TECHNICAL FIELD

The present invention relates to mobile terminals, and, in particular embodiments, to a method, a device, and a mobile terminal for controlling locking and unlocking.

BACKGROUND

In order to prevent misoperations, many terminals having a keyboard are provided with a locking and unlocking function at present. The locking and unlocking function is more necessary for such a mobile terminal as a mobile phone always in motion.

The existing locking and unlocking function generally keeps a terminal in two states, namely, a locked state and an unlocked state. Generally, locking is triggered by a condition that no operation of a user is detected within a set time, and unlocking is triggered by a condition that a key combination is pressed manually.

SUMMARY OF THE INVENTION

In the research process of researching the present invention, the inventor finds that the prior art has a number of defects. Taking a mobile phone as a mobile terminal, for example, in the use of the mobile phone, a user usually puts the mobile phone on a table or other fixed position. The keyboard of the mobile phone will be automatically locked when no operation of the user is detected within a certain period of time, so as to prevent misoperations that the user is unaware of. In fact, the mobile phone placed on a fixed object is in a relatively static state, and the probability of misoperations is rather low. Therefore, the locking operation does not achieve a desired effect but adds an unlocking procedure to the subsequent operation of the user, which reduces usability of the mobile phone and affects user's experience.

Accordingly, the present invention is directed to a method, a device, and a mobile terminal for controlling locking and unlocking to optimize a locking and unlocking function and improve usability of the mobile terminal.

In an embodiment, the present invention provides a method for controlling locking and unlocking, which includes the following steps.

An acceleration sensor is adopted to detect a location state of a mobile terminal. A stabilization timer is started and a stabilization timing value of the stabilization timer is monitored when the mobile terminal is in an unlocked or a locked state. The stabilization timing value is reset to restart timing when it is monitored that the location state of the mobile terminal is unstable. The mobile terminal is controlled to enter a stable and unlocked state when it is monitored that the stabilization timing value reaches a stabilization timing threshold.

In an embodiment, the present invention further provides a device for controlling locking and unlocking, which includes a location state monitoring module, a stabilization timing starting module, a stabilization timing monitoring module, a stabilization timing resetting module, and a stabilization unlocking starting module.

The location state monitoring module is configured to monitor a location state of a mobile terminal detected by an acceleration sensor.

The stabilization timing starting module is configured to start a stabilization timer when it is monitored that the mobile terminal is in an unlocked state or a locked state.

The stabilization timing monitoring module is configured to monitor a stabilization timing value of the stabilization timer.

The stabilization timing resetting module is configured to reset the stabilization timing value to restart timing when the location state monitoring module monitors that the location state of the mobile terminal is unstable.

The stabilization unlocking starting module is configured to control the mobile terminal to enter a stable and unlocked state when the stabilization timing monitoring module monitors that the stabilization timing value reaches a stabilization timing threshold.

In an embodiment, the present invention further provides a mobile terminal, which includes an acceleration sensor and further includes the device for controlling locking and unlocking of the present invention.

According to the technical solutions of the present invention, it is determined whether the mobile terminal enters the stable and unlocked state according to the location state of the mobile terminal in the locked or unlocked state. The above process is irrelevant to the action whether the user inputs unlocking keys or operates the mobile terminal. When the mobile terminal is in the stable state for a period of time within the set stabilization timing threshold, the mobile terminal is switched to the stable and unlocked state in which the user is allowed to operate the mobile terminal. In this manner, the mobile terminal may not be locked in the stable state, and then the afterward operations are facilitated, thereby increasing usability of the mobile terminal and improving user's experience.

DETAILED DESCRIPTION OF ILLUSTRATIVE EMBODIMENTS

The objectives, technical solutions, and advantages of the present invention will be described in further detail below through specific embodiments with the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
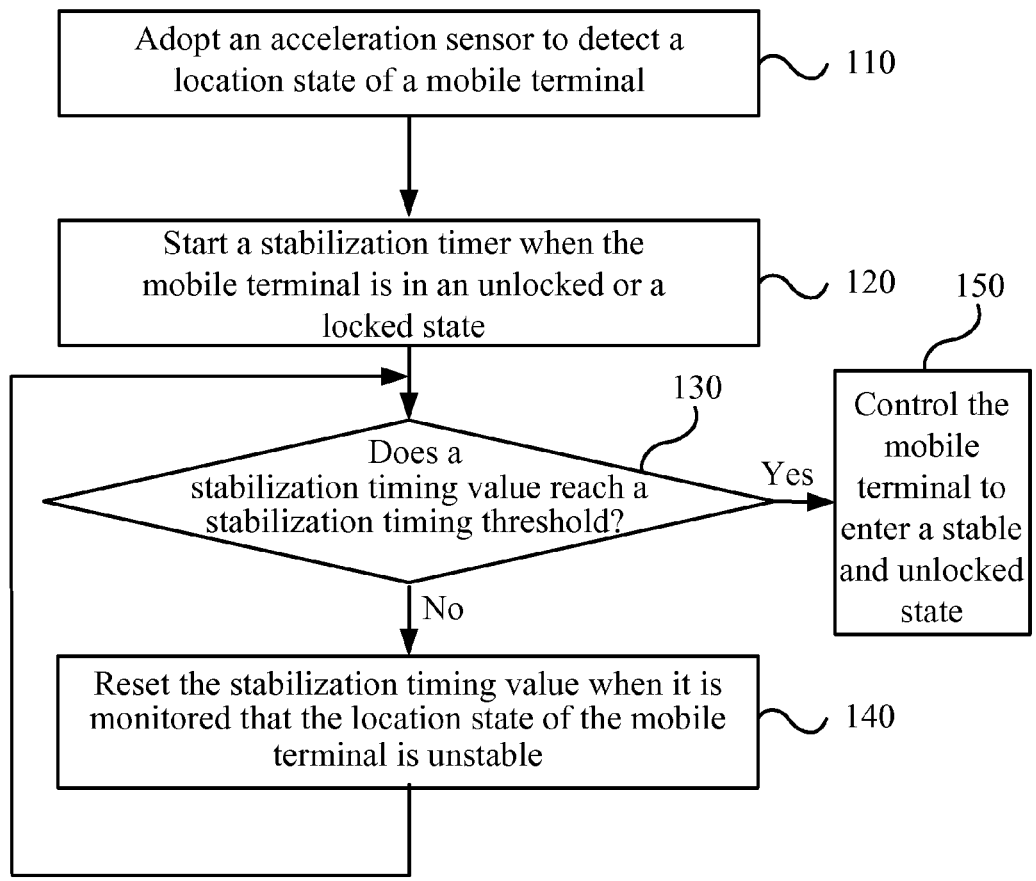
FIG. 1 is a flow chart of a method for controlling locking and unlocking according to embodiment one of the present invention.

A first embodiment will now be described. FIG. 1 is a flow chart of a method for controlling locking and unlocking according to a first embodiment of the present invention. In this embodiment, an acceleration sensor is adopted to detect a location state of a mobile terminal. The acceleration sensor is capable of conveniently detecting whether the mobile terminal is in an accelerated state and obtaining acceleration information including direction and speed.

Figure 2:
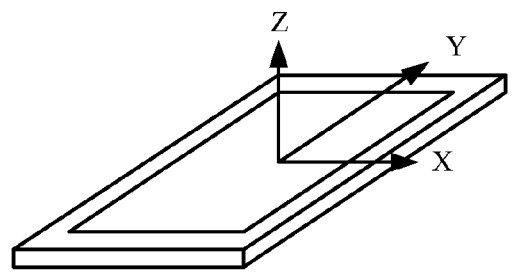
FIG. 2 is a schematic view of predefined coordinate axes of a mobile terminal according to the embodiment one of the present invention.

The principle for the acceleration sensor to detect the location state of the mobile terminal includes, but is not limited to, obtaining the location state of the mobile terminal by gravity detection. Coordinate axes may be predefined in the mobile terminal, for example, as shown in FIG. 2, an X-axis, a Y-axis, and a Z-axis are provided. When the mobile terminal lays flat in a static state with its screen facing upward, the negative direction of the Z-axis bears the gravity of the mobile terminal, and the forces borne on the X-axis and Y-axis can be neglected. When the mobile terminal inclines to the right, both the positive direction of the X-axis and the negative direction of the Z-axis bear the gravity of the mobile terminal, and the inclination angle of the mobile terminal can be obtained by measuring the gravity borne on each axis.

The location state of the mobile terminal detected by the acceleration sensor includes a motion state, a static state, an inclined state, and a horizontal state. The stable state includes a combination of the static state and the horizontal state, and any of the other location states or combinations of the location states is an unstable state, for example, a combination of the motion state and the inclined state, a combination of the motion state and the horizontal state, and a combination of the static state and the inclined state. As no absolute horizontal state or absolute static state exists in actual applications, a roughly static or horizontal condition can be set artificially.

The static state is a location state that a speed of the mobile terminal is lower than a set speed threshold. The horizontal state is a location state that an angle formed between a standard plane of the mobile terminal and a horizontal plane is smaller than a set angle threshold. For example, the set angle threshold may be 15°, when the inclination angle is within 15°, the mobile terminal is regarded in a horizontal state.

Based on the above technical solution, the control method of this embodiment specifically includes the following steps.

In Step 110, the acceleration sensor is adopted to detect the location state of the mobile terminal.

In Step 120, a stabilization timer is started when the mobile terminal is in an unlocked or a locked state.

In Step 130, a stabilization timing value of the stabilization timer is monitored to determine whether the value reaches a stabilization timing threshold, and if yes, Step 150 is performed; otherwise, Step 140 is performed.

In Step 140, when it is monitored that the location state of the mobile terminal is unstable, the stabilization timing value is reset to restart timing, and then Step 130 is performed.

In Step 150, the mobile terminal is controlled to enter a stable and unlocked state.

Figure 3:
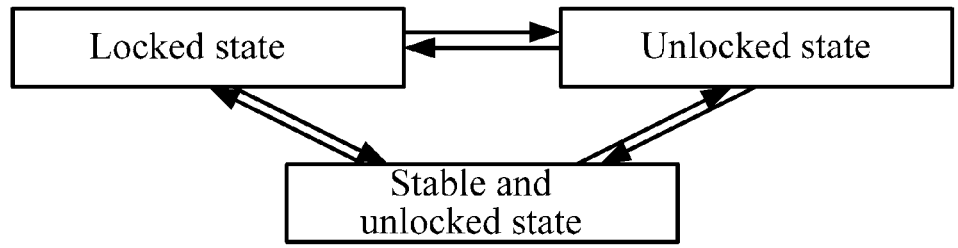
FIG. 3 is a schematic view of state transition of the mobile terminal according to the embodiment one of the present invention.

Compared with the conventional locking and unlocking technology, in the technical solution of this embodiment, the stable and unlocked state of the mobile terminal is added on the basis of the locked state and the unlocked state. FIG. 3 is a schematic view of state transition of the mobile terminal according to the first embodiment of the present invention, and the mobile terminal is switched between the locked state, the unlocked state, and the stable and unlocked state.

According to the technical solution of this embodiment, it is determined whether the mobile terminal enters the stable and unlocked state according to the location state of the mobile terminal in the locked or unlocked state. The above process is irrelevant to the action whether the user inputs unlocking keys or operates the mobile terminal. When the mobile terminal is in the stable state for a period of time within the set stabilization timing threshold, the mobile terminal is switched to the stable and unlocked state in which the user is allowed to operate the mobile terminal. In this manner, the mobile terminal may not be locked in the stable state, and then the afterward operations may be facilitated, thereby increasing usability of the mobile terminal and improving user's experience.

Figure 4:
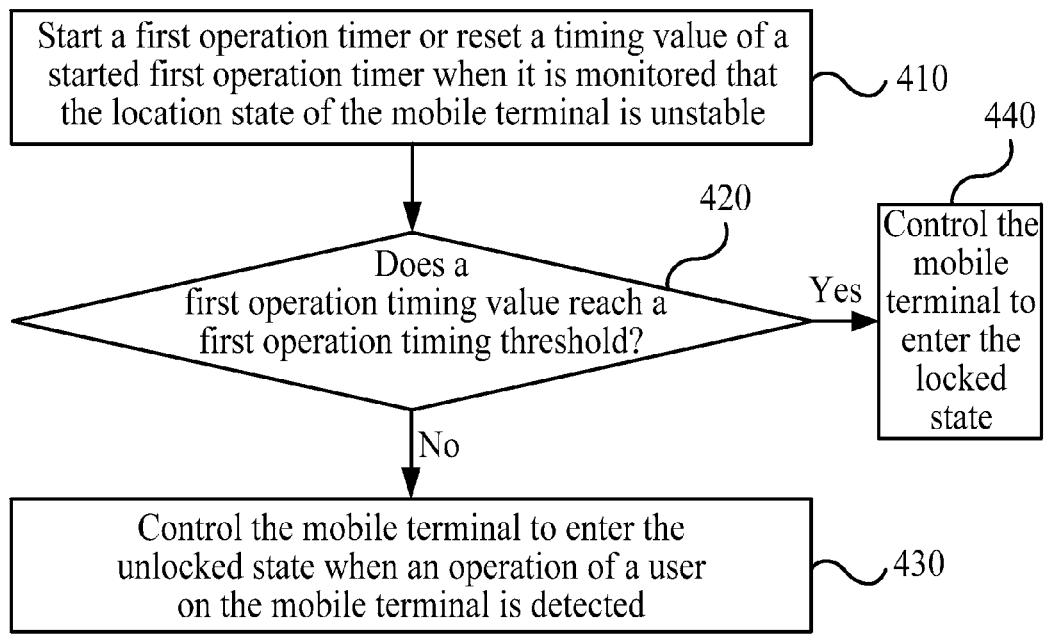
FIG. 4 is a flow chart of a method for controlling locking and unlocking according to embodiment two of the present invention.

A second embodiment will now be described. FIG. 4 is a flow chart of a method for controlling locking and unlocking according to a second embodiment of the present invention. Based on the first embodiment, the method of this embodiment further includes the following steps after the mobile terminal is controlled to enter the stable and unlocked state.

In Step 410, a first operation timer is started or a timing value of a started first operation timer is reset to restart timing when it is monitored that the location state of the mobile terminal is unstable.

In Step 420, the first operation timing value of the first operation timer is monitored to determine whether the value reaches a first operation timing threshold, and if yes, Step 440 is performed; otherwise, Step 430 is performed.

In Step 430, the mobile terminal is controlled to enter the unlocked state when an operation of a user on the mobile terminal is detected, and the process ends.

In Step 440, the mobile terminal is controlled to enter the locked state.

The technical solution of this embodiment provides the method for enabling the mobile terminal to enter the locked or the unlocked state from the stable and unlocked state. In the stable and unlocked state, whether the user operates the mobile terminal within a time period of the first operation timing threshold acts as a trigger condition, and if the user operates the mobile terminal, the mobile terminal enters the unlocked state; while if the user does not operate the mobile terminal, the mobile terminal enters the locked state. According to the above technical solution, the mobile terminal in the stable and unlocked state enters the locked state when the mobile terminal moves or inclines and is not operated by the user, thereby effectively preventing misoperations. If the mobile terminal just moves once and then recovers the static state, the mobile terminal may recover the stable and static state in a certain period of time through the solution of the first embodiment.

Figure 5:
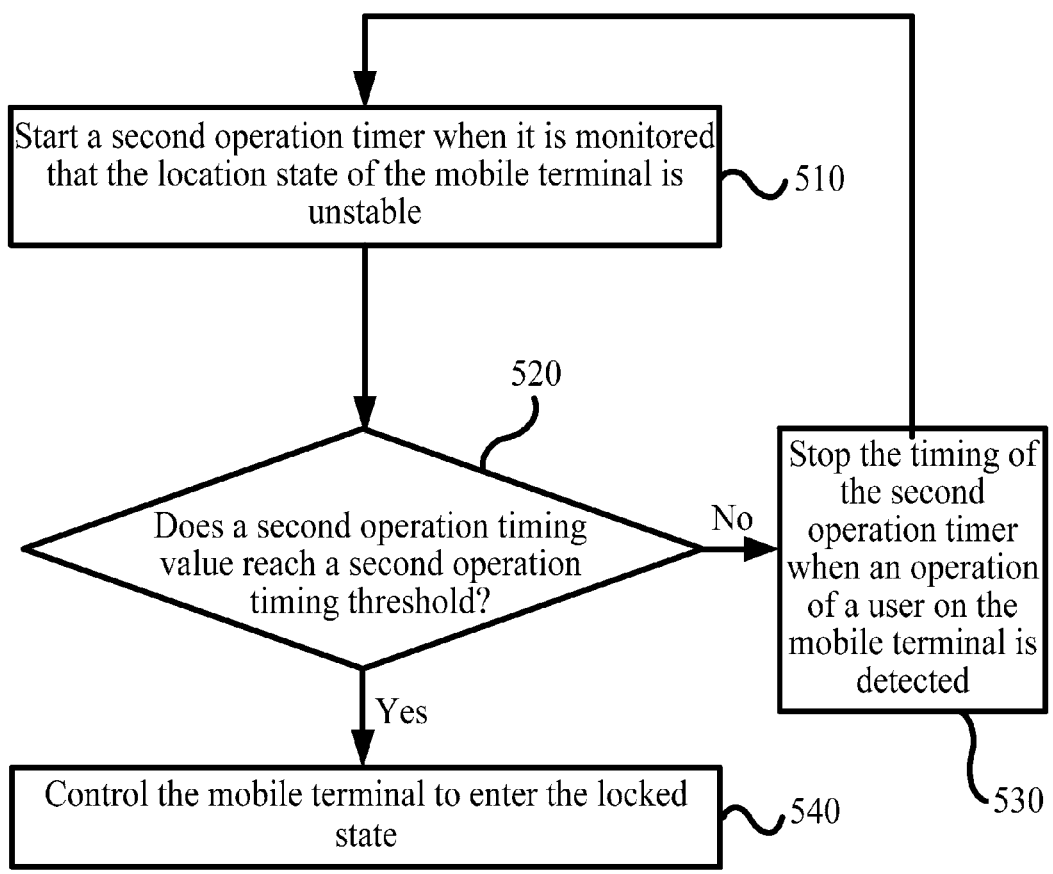
FIG. 5 is a flow chart of a method for controlling locking and unlocking according to embodiment three of the present invention.

A third embodiment will now be described. FIG. 5 is a flow chart of a method for controlling locking and unlocking according to a third embodiment of the present invention. This embodiment further provides a method for switching a mobile terminal between a locked state and an unlocked state. When the mobile terminal is in the unlocked state, the method includes not only starting a stabilization timer as described in the first embodiment, but also the following steps.

In Step 510, a second operation timer is started when it is monitored that the location state of the mobile terminal is unstable.

In Step 520, a second operation timing value of the second operation timer is monitored to determine whether the value reaches a second operation timing threshold, and if yes, Step 540 is performed; otherwise, Step 530 is performed.

In Step 530, the timing of the second operation timer is stopped and Step 510 is performed when an operation of a user on the mobile terminal is detected.

In Step 540, the mobile terminal is controlled to enter the locked state, that is, the user does not operate the mobile terminal within a time period of the second operation timing threshold. It is monitored that the second operation timing value reaches the second operation timing threshold, and the mobile terminal is locked.

The mobile terminal may directly enter the unlocked state from the locked state through unlocking keys input by the user.

According to the technical solution of this embodiment, the mobile terminal is enabled to automatically enter the locked state to prevent misoperations when the mobile terminal is in the unstable state and is not operated within a set period of time. If the unstable state of the mobile terminal is temporary, the mobile terminal may be further switched to the stable and unlocked state after entering the locked state provided that the mobile terminal is in the stable state within a certain period of time.

The stabilization timing threshold, the first operation timing threshold, the second operation timing threshold, the set speed threshold, and the set angle threshold in the above embodiment of the present invention may all be set by the user upon requirements. The stabilization timing threshold is influenced by sensitivity of the acceleration sensor and the system response time, so that an ideal value is preferably obtained through an actual test process and is preset in the mobile terminal.

Figure 6:
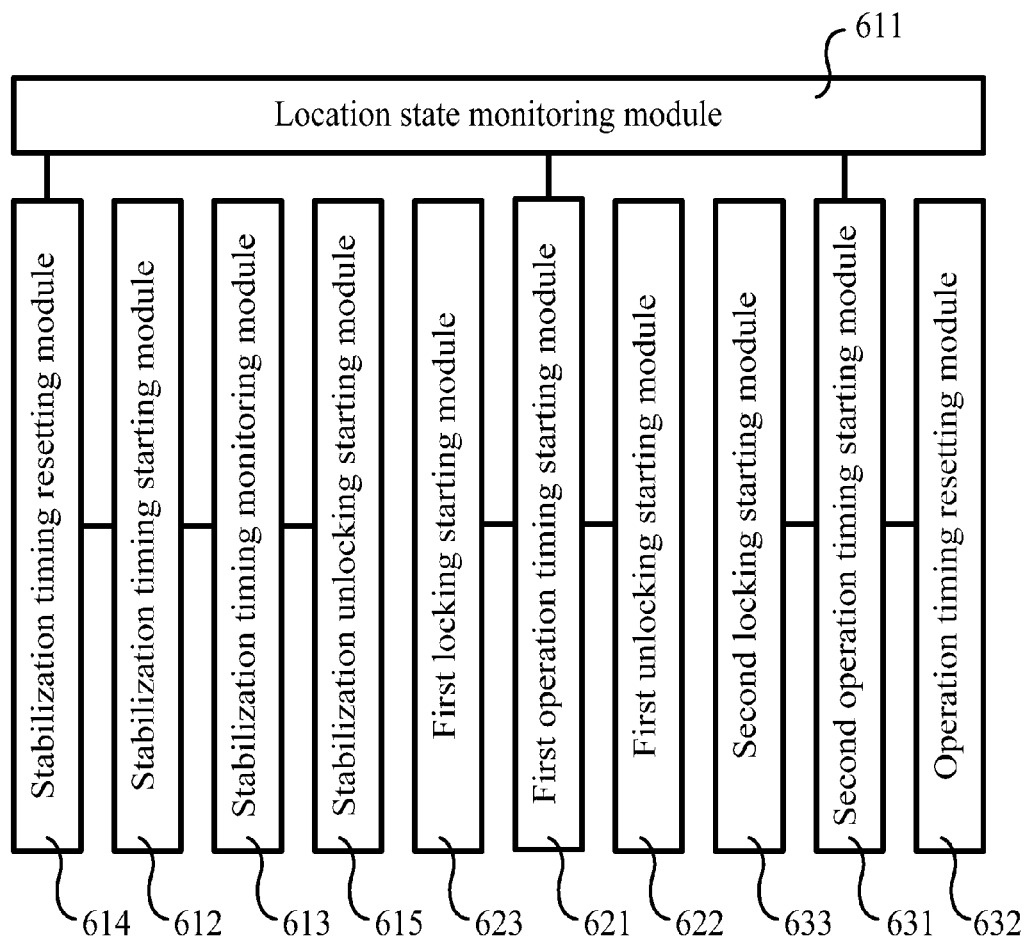
FIG. 6 is a schematic structural view of a device for controlling locking and unlocking according to embodiment four of the present invention.

A fourth embodiment will now be described. FIG. 6 is a schematic structural view of a device for controlling locking and unlocking according to a fourth embodiment of the present invention. The device may be integrated into a mobile terminal and specifically includes a location state monitoring module 611, a stabilization timing starting module 612, a stabilization timing monitoring module 613, a stabilization timing resetting module 614, and a stabilization unlocking starting module 615. The location state monitoring module 611 is configured to monitor a location state of the mobile terminal detected by an acceleration sensor. The stabilization timing starting module 612 is configured to start a stabilization timer when it is monitored that the mobile terminal is in an unlocked state or a locked state. The stabilization timing monitoring module 613 is configured to monitor a stabilization timing value of the stabilization timer. The stabilization timing resetting module 614 is configured to reset the stabilization timing value to restart timing when the location state monitoring module 611 monitors that the location state of the mobile terminal is unstable. The stabilization unlocking starting module 615 is configured to control the mobile terminal to enter a stable and unlocked state when the stabilization timing monitoring module 613 monitors that the stabilization timing value reaches a stabilization timing threshold.

Based on the above technical solution, the device may further include a first operation timing starting module 621, a first unlocking starting module 622, and a first locking starting module 623. The operation timing starting module 621 is configured to start a first operation timer or reset a timing value of a started first operation timer to restart timing when it is monitored that the mobile terminal is in the stable and unlocked state and the location state monitoring module 611 monitors that the location state of the mobile terminal is unstable. The first unlocking starting module 622 is configured to control the mobile terminal to enter the unlocked state when an operation of a user on the mobile terminal is detected. The first locking starting module 623 is configured to control the mobile terminal to enter the locked state when it is monitored that the first operation timing value reaches a first operation timing threshold.

Based on the above technical solution, the device may further include a second operation timing starting module 631, an operation timing resetting module 632, and a second locking starting module 633. The second operation timing starting module 631 is configured to start a second operation timer when it is monitored that the mobile terminal is in the unlocked state and the location state of the mobile terminal is unstable. The operation timing resetting module 632 is configured to stop the timing of the second operation timer when an operation of the user on the mobile terminal is detected. The second locking starting module 633 is configured to control the mobile terminal to enter the locked state when it is monitored that the second operation timing value reaches a second operation timing threshold.

The device for controlling locking and unlocking of this embodiment may implement the method for controlling locking and unlocking of the present invention and has corresponding functional modules. Therefore, the mobile terminal is enabled to enter the stable and unlocked state when in the stable state, which has not much influence on the probability of misoperations and also facilitates the timely use of the mobile terminal by the user, thus increasing usability of the mobile terminal and improving user's experience.

In an embodiment, the present invention further provides a mobile terminal, which includes an acceleration sensor and further includes a device for controlling locking and unlocking according to any embodiment of the present invention.

In the technical solution of the present invention, a mobile terminal that assists a keyboard locking determination process with a location state obtained by a built-in acceleration sensor is provided. A typical example of the mobile terminal may be a mobile phone. In a stable and unlocked state, if a user takes up the mobile phone for use, the mobile phone enters an unlocked state; while if the user takes up the mobile phone and puts it in a scene where misoperations may easily occur, for example, in a pocket, the mobile phone enters a locked state. The operation of taking up the mobile phone by the user may be detected by the acceleration sensor; and whether the user takes up the mobile phone for use or puts the mobile phone in a scene where misoperations may easily occur can be learned from the operation of the user on the mobile phone after taking up the mobile phone.

After the above technical solution is applied to the mobile terminal, when the user takes up the mobile terminal from a table or other fixed positions, the user does not need to manually unlock the mobile terminal, thereby improving the usability of the mobile terminal.

Persons of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a ROM, a RAM, a magnetic disk, or an optical disk.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. A method for controlling locking and unlocking, the method comprising:
   using an acceleration sensor to detect a location state of a mobile terminal;
   starting a stabilization timer;
   monitoring a stabilization timing value of the stabilization timer when the mobile terminal is in an unlocked or a locked state;
   resetting the stabilization timing value to restart timing when it is monitored that the location state of the mobile terminal is unstable; and
   controlling the mobile terminal to enter a stable and unlocked state when it is monitored that the stabilization timing value reaches a stabilization timing threshold.

2. The method according to claim 1, wherein after the controlling the mobile terminal to enter the stable and unlocked state, the method further comprises:
   starting a first operation timer or resetting a timing value of a started first operation timer to restart timing when it is monitored that the location state of the mobile terminal is unstable;
   controlling the mobile terminal to enter an unlocked state when an operation of a user on the mobile terminal is detected; and
   controlling the mobile terminal to enter a locked state when it is monitored that the first operation timing value reaches a first operation timing threshold.

3. The method according to claim 2, wherein when the mobile terminal is in the unlocked state, the method further comprises:
   starting a second operation timer when it is monitored that the location state of the mobile terminal is unstable;
   stopping the timing of the second operation timer when an operation of the user on the mobile terminal is detected; and
   controlling the mobile terminal to enter the locked state when it is monitored that the second operation timing value reaches a second operation timing threshold.

4. The method according to claim 1, wherein when the mobile terminal is in the unlocked state, the method further comprises:
   starting a second operation timer when it is monitored that the location state of the mobile terminal is unstable;
   stopping the timing of the second operation timer when an operation of a user on the mobile terminal is detected; and
   controlling the mobile terminal to enter the locked state when it is monitored that the second operation timing value reaches a second operation timing threshold.

5. The method according to claim 1, wherein
   the location state of the mobile terminal detected by the acceleration sensor comprises at least one of a motion state, a static state, an inclined state, and a horizontal state, wherein the stable state comprises a combination of the static state and the horizontal state, and any of the other location states or combinations of the location states is an unstable state.

6. The method according to claim 5, wherein the static state is a location state that a speed of the mobile terminal is lower than a set speed threshold; and the horizontal state is a location state that an angle formed between a standard plane of the mobile terminal and a horizontal plane is smaller than a set angle threshold.

7. The method according to claim 6, wherein the set angle threshold is 15°.

8. A device, comprising:
   a location state monitoring module, configured to monitor a location state of a mobile terminal detected by an acceleration sensor;
   a stabilization timing starting module, configured to start a stabilization timer when it is monitored that the mobile terminal is in an unlocked state or a locked state;
   a stabilization timing monitoring module, configured to monitor a stabilization timing value of the stabilization timer;
   a stabilization timing resetting module, configured to reset the stabilization timing value to restart timing when the location state monitoring module monitors that the location state of the mobile terminal is unstable; and
   a stabilization unlocking starting module, configured to control the mobile terminal to enter a stable and unlocked state when the stabilization timing monitoring module monitors that the stabilization timing value reaches a stabilization timing threshold.

9. The device according to claim 8, further comprising:
   a first operation timing starting module, configured to start a first operation timer or reset a timing value of a started first operation timer to restart timing when it is monitored that the mobile terminal is in the stable and unlocked state and the location state monitoring module monitors that the location state of the mobile terminal is unstable;
   a first unlocking starting module, configured to control the mobile terminal to enter the unlocked state when an operation of a user on the mobile terminal is detected; and
   a first locking starting module, configured to control the mobile terminal to enter the locked state when it is monitored that the first operation timing value reaches a first operation timing threshold.

10. The device according to claim 9, further comprising:
    a second operation timing starting module, configured to start a second operation timer when it is monitored that the mobile terminal is in the unlocked state and the location state of the mobile terminal is unstable;
    an operation timing resetting module, configured to stop the timing of the second operation timer when an operation of the user on the mobile terminal is detected; and
    a second locking starting module, configured to control the mobile terminal to enter the locked state when it is monitored that the second operation timing value reaches a second operation timing threshold.

11. The device according to claim 8, further comprising:
    a second operation timing starting module, configured to start a second operation timer when it is monitored that the mobile terminal is in the unlocked state and the location state of the mobile terminal is unstable;
    an operation timing resetting module, configured to stop the timing of the second operation timer when an operation of a user on the mobile terminal is detected; and
    a second locking starting module, configured to control the mobile terminal to enter the locked state when it is monitored that the second operation timing value reaches a second operation timing threshold.

12. A mobile terminal, comprising:
    an acceleration sensor;

a location state monitoring module, configured to monitor a location state of a mobile terminal detected by the acceleration sensor;

a stabilization timing starting module, configured to start a stabilization timer when it is monitored that the mobile terminal is in an unlocked state or a locked state;

a stabilization timing monitoring module, configured to monitor a stabilization timing value of the stabilization timer;

a stabilization timing resetting module, configured to reset the stabilization timing value to restart timing when the location state monitoring module monitors that the location state of the mobile terminal is unstable; and a stabilization unlocking starting module, configured to control the mobile terminal to enter a stable and unlocked state when the stabilization timing monitoring module monitors that the stabilization timing value reaches a stabilization timing threshold.

13. The mobile terminal according to claim 12, further comprising:
a first operation timing starting module, configured to start a first operation timer or reset a timing value of a started first operation timer to restart timing when it is monitored that the mobile terminal is in the stable and unlocked state and the location state monitoring module monitors that the location state of the mobile terminal is unstable;

a first unlocking starting module, configured to control the mobile terminal to enter the unlocked state when an operation of a user on the mobile terminal is detected; and a first locking starting module, configured to control the mobile terminal to enter the locked state when it is monitored that the first operation timing value reaches a first operation timing threshold.

14. The mobile terminal according to claim 13, further comprising:
a second operation timing starting module, configured to start a second operation timer when it is monitored that the mobile terminal is in the unlocked state and the location state of the mobile terminal is unstable;

an operation timing resetting module, configured to stop the timing of the second operation timer when an operation of the user on the mobile terminal is detected; and a second locking starting module, configured to control the mobile terminal to enter the locked state when it is monitored that the second operation timing value reaches a second operation timing threshold.

15. The mobile terminal according to claim 12, further comprising:
a second operation timing starting module, configured to start a second operation timer when it is monitored that the mobile terminal is in the unlocked state and the location state of the mobile terminal is unstable;

an operation timing resetting module, configured to stop the timing of the second operation timer when an operation of a user on the mobile terminal is detected; and a second locking starting module, configured to control the mobile terminal to enter the locked state when it is monitored that the second operation timing value reaches a second operation timing threshold.

* * * * *